United States Patent Office 3,357,220
Patented Dec. 12, 1967

3,357,220
PROTECTION AND LUBRICATION OF METALS AT HIGH TEMPERATURES
Robert H. Dalton and Peter Grego, Corning, N.Y., assignors to Corning Glass Works, Corning, N.Y., a corporation of New York
No Drawing. Filed July 10, 1964, Ser. No. 381,930
7 Claims. (Cl. 72—42)

ABSTRACT OF THE DISCLOSURE

An improved method of protecting metal bodies against oxidation during metal working by applying a vitrifiable, foamable coating to the metal bodies, heating the coated metal bodies to the metal working temperature whereby the coating softens and foams and subjecting the metal bodies to a shaping operation.

---

This invention relates to the use of foamed vitreous coatings to protect metals from oxidation at high temperatures.

It is known to employ vitreous lubricating agents, particularly glasses and enamels to protect metals from oxidation and to serve as a lubricant during hot metal working operations such as extrusion or forging. Operations of this nature are of necessity conducted at relatively high temperatures. Operating temperatures may vary from about 800° F. for soft metals such as aluminum or magnesium, up to around 2500° F. for certain steels, and even higher temperatures for more refractory metals such as molybdenum or tungsten.

Organic type lubricants are generally ineffective at these elevated temperatures and inorganic salts find little use because of their high fluidity or low viscosity in the molten state. Vitreous materials, on the other hand, have a high viscosity in the molten state and like organic lubricants become progressively softer or less viscous with increasing temperatures. Further, the plastic or fluid state occurs at the elevated temperatures required for metal working. Also, vitreous materials do not undergo chemical changes such as oxidation or decomposition at these temperatures, nor do they volatilize objectionably.

However, difficulty is commonly experienced in retaining a continuous coating of vitreous material on a metal work piece during the heat up period prior to a hot metal working operation. As the metal is heated during this preheat period, the vitreous coating becomes progressively less viscous and tends to flow down the side of the metal breaking the continuity of the coating and leaving exposed metal surfaces. The present invention is concerned primarily with the problem of retaining a continuous protective coating on metal work pieces during the preheat period.

We have now found that this tendency of a vitreous coating to flow from the hot metal during a preheat period, may be minimized at temperatures at least as high as 2200° F., by employing additives which convert the glass coating material to a foam as it softens. Small percentages of carbon, sulfates or other foaming agents may be incorporated in a glass coating to produce a stable, frothy, light-weight foamed coating on the metal. While a foamed glass coating exhibits a greater resistance to flow at elevated temperatures than a correspoinding unfoamed glass coating, the glass is fluid enough to serve as an effective lubricant during a subsequent hot metal working operation.

Various glass compositions may be used to provide the vitreous foamed coating of the present invention. The selection of a particular glass composition will be governed by the temperature-viscosity characteristics required for the subsequent metal working operation. A glass may be selected which will have the proper temperature-viscosity characteristics to serve as a lubricant at the working temperature. In general, harder or higher melting glasses will be used for the more refractoy metals, such as molybdenum and tungsten and lower melting glasses for the less refractory metals, such as the bronzes, magnesium or aluminum. However, a glass should be selected which will begin to fuse below the temperature at which rapid and objectionable oxidation will occur in the particular metal to be protected. Little or no protection from oxidation is obtained until the glass begins to fuse.

Foamable glass coating materials may be prepared in accordance with standard techniques for making foamed glass by intimately mixing a foaming agent with a suitable glass powder. Alternatively, in place of the glass powder, or in addition to it, a powdered glass-batch material may be employed. The foamable coating material may be applied to the metal workpiece either in dry powder form or in the form of a suspension or slurry of the powder in a stable liquid medium, such as isopropyl alcohol, water, trichloroethane or methanol. The liquid suspension may be applied by spraying, dipping, brushing, rolling or other means.

If desired, additional green strength may be imparted to the initial coating by incorporating therein a binder such as a silicone or other type of resin. As an example of one method of application, the metal work piece is dipped into a slurry of foamable glass powder in a liquid medium and withdrawn slowly to provide maximum coating. It is preferred that the coating be a minimum of ⅛" thick. If, after dipping, some areas of the metal work piece are not covered, they may be patched up readily by brushing on more slurry. The coated work piece is then dried to evaporate the vehicle. After drying, the metal work piece is heated to the temperature required for the subsequent metal working operation. As the metal work piece is heated, the glass powder begins to melt and as the temperature increases, the components react to produce a stiff vitreous foam which envelopes the metal work piece. At this stage, if desired, more dry glass powder may be placed on top of the work piece to develop more foam that will radually flow over the top and down the side of the work piece, thus insuring continuous protection from oxidation and providing a plentiful supply of lubricant for the subsequent hot working. When the required temperature is reached, the hot working, such as extrusion etc., may be performed and the glass foam enveloping the work piece will serve as a lubricant for the working operation.

The following specific examples will serve to further illustrate the invention.

*Example 1*

A borosilicate glass having the following approximate composition in percent by weight: $SiO_2$ 80.7%, $B_2O_3$, 12.9%, $Na_2O$ 3.8%, $Al_2O_3$ 2.2%, $K_2O$ 0.4%, was ground to a fine powder (minus 325 mesh), intimately mixed with 0.25% lampblack foaming agent, and the powdered mixture placed in a 96% silica crucible. A billet of SAE No. 4340 construction steel alloy was immersed in the powder and then placed in a preheated furnace at 2200° F. for 6 hours. When the temperature of the glass reached about 1500° F. the glass began to fuse and as the temperature increased, the components reacted to produce a protective foamed glass coating around the billet.

*Example 2*

A foamable powdered mixture was prepared by mixing the following components.

| Component: | Parts by wt. |
|---|---|
| Feldspar | 980 |
| Powdered glass | 111 |
| Sodium sulfate | 15 |
| Silicon carbide | 5 |

All components were ground to a −325 mesh powder. The composition of the powdered glass was 25% by weight $Na_2O$ and 75% by weight $SiO_2$. The composition of the feldspar, on an oxide basis, in percent by weight was as follows 66% $SiO_2$, 18.4% $Al_2O_3$, 10.3% $K_2O$, 4.3% $Na_2O$, 0.5% CaO, and 0.5% BaO. A coating slurry was prepared by combining 500 parts by weight of this powdered mix with 60 parts of a silicone resin (Dow Corning 804) and 100 parts trichloroethane. The silicone resin served as a binding agent to impart green strength to the initial coating. In addition, the resin served as a source of carbon during the foaming of the glass.

Next, a billet of SAE No. 4340 construction steel alloy about 3″ in diameter and 3″ in height was dipped into a bath of the above described slurry and slowly withdrawn. The coating provided in this manner was approximately ¼″ thick. After this, the coating was thoroughly dried and the billet placed in a furnace, preheated to a temperature of about 2200° F. The billet was held at this temperature for a period of 5 hours. As the temperature of the billet increased, the glass powder began to fuse in the 1000 to 1100° F. range and as the temperature increased, the components reacted to produce a stiff vitreous foam enveloping the billet. The vitreous foamed coating provided an excellent protection from oxidation during the preheat period and served as a lubricant for subsequent extrusion operation.

In another experiment, the procedure of Example 2 was repeated, except that the foaming agent was omitted. During the preheat period, the unfoamed glass flowed, leaving exposed surfaces of metal which became badly oxidized prior to the extrusion operation.

*Example 3*

A foamable powdered mixture was prepared by mixing and grinding to −325 mesh, the following components.

| Component: | Parts by wt. |
|---|---|
| Feldspar | 786 |
| Powdered glass | 80 |
| Sodium sulfate | 10 |
| Silicon carbide | 4 |
| Powdered carbon | 2.2 |

The compositions of the feldspar and the glass employed are shown in Example 2.

A slurry was prepared by adding 500 parts of the above powdered mixture to 100 parts trichloroethane and 3 parts of a binding agent (Carbowax M600).

The slurry was coated on a billet of SAE No. 4340 steel, the coating dried, and then sintered at about 1650° F. On sintering, a few cracks developed in the coating. These were eliminated by applying a small amount of the powdered mixture. The coated billet was then heated in air at about 2200° F. for 6 hours. As the temperature of the billet increased, a stiff, vitreous foam developed around the billet. At the end of 6 hours, an examination of the billet disclosed practically no oxidation.

Numerous variations and modifications of the present invention will be apparent to those skilled in the art. For example, in lieu of using an organic binder, or in addition to it, a fiber-glass matting may be wrapped around the billet to hold the powdered glass in place. Such an outer binder permits the initially coated metal work piece to be handled readily with a minimum risk of some of the glass powder being removed during such handling.

Other suitable foaming agents which may be used in the practice of the present invention, include, for example, sodium sulfate, calcium sulfate, silicon carbide, and various carbonaceous materials, e.g. sugar, starch, coal dust, carbon.

Other variations and modifications of the invention as hereinabove set forth, may be made without departing from the spirit and scope of the invention. The invention is not to be limited to those details shown except as set forth in the appended claims.

We claim:
1. A method of metal working which comprises the steps of (A) applying a vitrifiable, foamable coating to a metal body, (B) heating the coated metal body to the desired metal working temperature, thereby softening and foaming the coating to produce a protective foamed glass coating and (C) subjecting the metal body to a shaping operation whereby the foamed glass coating serves as a lubricant.

2. A method according to claim 1 wherein said foamable coating comprises a glass powder having a foaming agent incorporated therein.

3. A method according to claim 1 wherein said foamable coating comprises a finely divided glass-batch material having a foaming agent incorporated therein.

4. A method according to claim 1 wherein said foamable coating comprises a mixture of powdered glass and powdered glass-batch material, having a foaming agent incorporated therein.

5. A method according to claim 1 wherein a fibrous glass binder is placed around the coated metal body, prior to heating.

6. A method according to claim 1 wherein said foamable coating comprises a glass powder plus a foaming agent in a liquid vehicle.

7. A method according to claim 6 wherein said foamable coating contains a binding agent.

References Cited

UNITED STATES PATENTS

| 2,706,850 | 4/1955 | Sejournet et al. | 72—46 |
| 3,154,849 | 11/1964 | Dolch | 72—42 |
| 3,181,324 | 5/1965 | Labino | 72—42 |
| 3,254,401 | 6/1966 | Dalton et al. | 29—43 |
| 3,293,894 | 12/1966 | Edgecombe et al. | 72—46 |
| 3,295,346 | 1/1967 | Bomberger | 72—46 |

CHARLES W. LANHAM, *Primary Examiner.*

E. M. COMBS, *Assistant Examiner.*